Patented Mar. 24, 1931

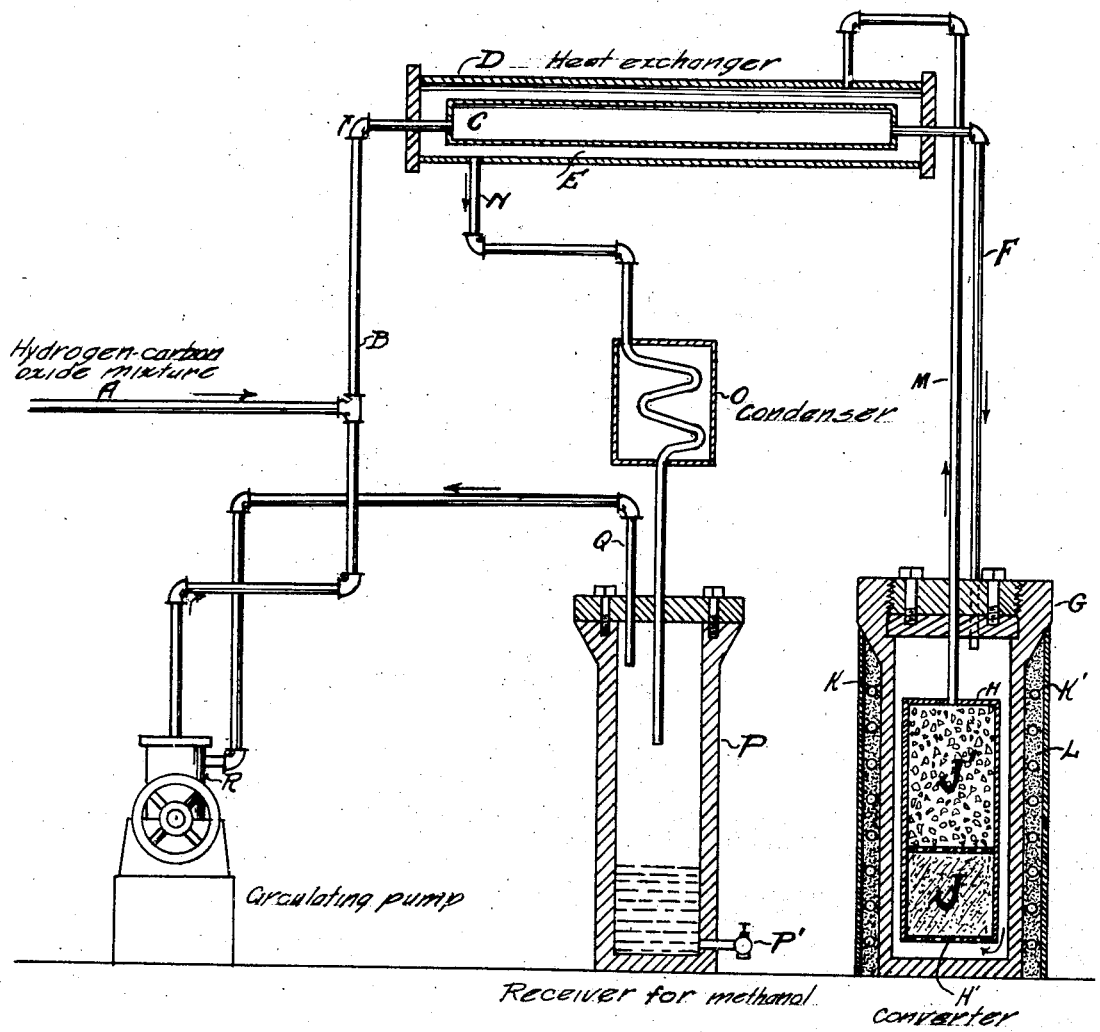

1,797,569

UNITED STATES PATENT OFFICE

WILLIAM J. EDMONDS, OF BAYTOWN, TEXAS, AND LEONARD A. STENGEL, OF TERRE HAUTE, INDIANA, ASSIGNORS TO COMMERCIAL SOLVENTS CORPORATION, OF TERRE HAUTE, INDIANA, A CORPORATION OF MARYLAND

SYNTHETIC METHANOL PROCESS

Application filed December 13, 1926, Serial No. 154,635. Renewed February 7, 1931.

Our invention pertains to an improvement in the process of producing synthetic methanol by the reaction of hydrogen and oxides of carbon at elevated temperatures and pressures under the influence of catalysts. More particularly, our invention relates to a continuous circulatory process permitting the correct adjustment of the proportions of reacting gases.

As is well known, methanol may be produced by the interaction of hydrogen with carbon monoxide, or with carbon dioxide, or with mixtures of these two oxides. Ordinarily in the practical operation of the process, a mixture of carbon monoxide with smaller quantities of carbon dioxide is employed to react with the hydrogen, since such mixtures are the most easily obtainable for manufacturing use.

The reaction by which methanol is produced from hydrogen and carbon monoxide is thought to be the following:

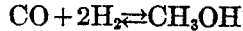

$$CO + 2H_2 \rightleftharpoons CH_3OH$$

When carbon dioxide reacts with hydrogen to form methanol it has been generally assumed that the reaction may be written in two steps, thus:

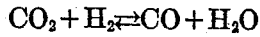

$$CO_2 + H_2 \rightleftharpoons CO + H_2O$$

$$CO + 2H_2 \rightleftharpoons CH_3OH$$

From the theoretical equations involved it might be further assumed that the optimum proportions of reacting materials for methanol production would be one volume of carbon monoxide to two volumes of hydrogen, and/or one volume of carbon dioxide to three volumes of hydrogen. However, it is well known that optimum results are obtained in methanol synthesis when the proportion of hydrogen to carbon oxides is greater than that theoretically required. (Cf. English Patent 229,714; page 1, line 34.) This is for the reason that the presence of an excess of hydrogen over that theoretically required to react with the carbon oxides present tends to prevent the occurrence of undesirable side-reactions which produce free carbon, methane, water, etc., rather than methanol.

Methanol is produced when mixtures of carbon oxides and hydrogen in theoretical proportions, or mixtures in which there is an excess of hydrogen over that theoretically required, are passed over suitable catalysts at temperatures of from 300 to 500° C. and at pressures in excess of 50 atmospheres. In case carbon dioxide is the carbon oxide employed, there is also produced one molecule of water per molecule of methanol, as was shown in the equation cited. If operating conditions are not correctly adjusted, or if improper catalysts are employed, side-reactions occur producing products other than methanol and water.

Catalysts suitable for the reaction may comprise mixtures of metallic oxides such as are described, for example, in United States Patents 1,558,559; 1,608,643; and 1,609,593; and in English Patents 229,714-15. The amount of methanol produced per hour varies with the quantity of catalyst employed, and with the space velocity of gas passage, as well as with the precise temperature and pressure.

The method of manufacture of methanol from mixtures of hydrogen and carbon oxides may be more clearly described with reference to Fig. 1 of the drawing which shows a suitable apparatus in cross-section. The gas mixture to be reacted is supplied to the process at the desired pressure through the "make-up" gas pipe A by the compressor (not shown). This gas mixes with the gas of the circulating system at connection B, and the mixed gases pass upward into the internal passage C of heat exchanger D. While passing through the heat exchanger the gas is heated by thermal contact with the hot gas from the methanol reaction which passes in reverse direction through the annular space E between the inner and outer walls of the heat exchanger. From the exchanger the warmed gas passes downward through pipe F into the converter (catalyst bomb) G. The gas passes downward in the annular space between the inside wall of the converter and the wall of the catalyst basket H then rises upward through the catalyst J and J' through the perforated plate H' forming the bottom of the basket H.

The drawing shows the catalyst as separated into two sections, J and J'. Section J is designed to act as a "pre-catalyst" or purifier, to destroy or absorb any catalyst poisons which may be present in the gas, and thus to preserve the catalytic activity of section J' for the methanol reaction. The elevated temperature in the converter G is largely maintained by the heat of reaction, but supplementary heat is provided for by means of electric heating elements K, K', embedded in an insulating jacket L which surrounds G.

As the hot gas passes through the catalyst the methanol reaction occurs, though all of the carbon oxides present in the gas are not reacted at one passage. The hot gas discharged from the converter through pipe M contains methanol vapors (water if carbon dioxide is present), and any reaction by-products formed, as well as unreacted carbon oxides and hydrogen. This gas passes through the annular space E of heat exchanger D, giving up most of its heat to the incoming gas.

The partially cooled gas then passes from the heat exchanger D via pipe N to the condenser O where it is cooled. The methanol thus obtained in liquid form together with any water present is deposited in the receiver P, from which the liquid may be removed through drain P'. The residual unreacted gas rises through pipe Q and passes to circulating pump R. In operating the process, the circulating pump R serves to circulate the gas through the system to overcome pressure drops due to friction in the pipes and catalyst chamber. There is of course a constant diminution in the pressure of the system due to the reaction of the gases to form methanol. To sustain the pressure in the circulating system and to replace the gases consumed by the reaction, make-up gas is continually supplied under pressure through pipe A.

As a specific example of the operation of the apparatus, the following data are given.

*Example I*

A gas mixture consisting of approximately theoretical proportions of carbon dioxide and hydrogen (25% carbon dioxide and 75% hydrogen) was continually supplied to the apparatus at a pressure of 3,500 pounds, and passed through the catalyst at a space velocity of 100,000. The catalyst employed was one containing a mixture of zinc oxide and chromic oxide, and the temperature of the reaction was maintained at 420° C. Under these conditions there was produced about 1.5 liters of condensate per hour per liter of catalyst. This experiment is typical of the results attained when hydrogen and carbon oxides are present in theoretical proportions while passing over a methanol catalyst.

On a laboratory scale one may very simply employ a gas mixture of carbon oxides and hydrogen, the latter gas being present in a proportion greater than that theoretically required. It is merely necessary to prepare a gas mixture of predetermined proportions, and pass it over a catalyst at the proper temperature and pressure. However when operating on a large industrial scale it is economically necessary to provide for the recirculation of the gases over the catalyst until a complete reaction to synthetic methanol is obtained and when such recirculation is attempted difficulties arise if one attempts to use a gas mixture containing a proportion of carbon oxides to hydrogen that is different from that theoretically required. For example when one attempts to employ a mixture of gas containing 25% carbon monoxide and 75% hydrogen (instead of the theoretical ratio 33:66) in the synthetic methanol process while employing a system for recirculating the unreacted gases and supplying only sufficient make-up gas to maintain the pressure, there will be a continual change of the nature of the gas circulating over the catalyst.

Since the "make-up" gas supplied to the system contains more hydrogen than is required for the reaction, and since this gas continually replaces that part of the mixture which enters into the methanol reaction (in theoretical proportions), the proportion of hydrogen in the circulating system increases as the process is continued, until eventually the proportion of carbon monoxide in the system grows so small that practically no methanol is produced. A precisely similar phenomenon occurs when one attempts to operate on a mixture of carbon dioxide and hydrogen not in theoretical proportions.

We have now discovered a method whereby the difficulty of operating a continuous circulating process for the production of methanol by the catalytic interaction of carbon oxides and hydrogen in a gas mixture containing the ingredients in proportions differing from the theoretical may be obviated. By means of our improved process it is possible to obtain the economic advantages of employing an excess of hydrogen in the gases passing over the catalyst, and at the same time to maintain a static condition whereby the composition of the gas in the circulating system remains substantially unchanged during operation and whereby the make-up gas supplied to the process need not be varied in composition.

In accordance with our invention it is possible to operate the synthetic methanol process in such a manner that a gas containing theoretical proportions of carbon oxides and hydrogen may be supplied to the process as "make-up" gas, whereas the gas actually passing over the catalyst contains a great excess of hydrogen over that theoretically required. We may accomplish this result by filling the apparatus with a gas consisting of substantially pure hydrogen at a pressure somewhat below the pressure desired for the reaction. The circulation of this hydrogen through the apparatus naturally produces no chemical change. When the apparatus has been filled with hydrogen at a pressure approximating the pressure required for operation, the character of the "make-up" gas is changed, and instead of pure hydrogen, a mixture of hydrogen and carbon oxides in the proportions theoretically required for methanol synthesis is passed into the apparatus.

The carbon oxide containing gas is blended with the hydrogen in the circulating system at connection B, and passes through the circulating system. Hence the gas passing through the catalyst J—J' contains a great preponderance of hydrogen over carbon oxides, and desirable conditions for the conversion of all of the carbon oxides to methanol are thus attained.

During the reaction of the carbon oxides to form methanol, the proportion of hydrogen removed is equal to the amount of hydrogen that entered the system with the carbon oxides, for these two gases were present in theoretical proportions in the "make-up" gas. It is thus seen that the introduction of a gas containing theoretical proportions of carbon oxides and hydrogen into a circulating system which contains only a small proportion of carbon oxides does not change the character of the gas in the circulating system, since the methanol reaction constantly removes carbon oxides and hydrogen in the same proportion in which they are introduced in the "make-up" gas.

As illustrative of the results attained by the employment of our invention, the following examples are cited.

Example II

Hydrogen gas was supplied to the process through the "make-up" gas pipe A until the pressure had been built up to 2,000 pounds. The character of the "make-up" gas was then changed, and a mixture of carbon dioxide and hydrogen in theoretical proportions was passed into the apparatus until the pressure had reached 3,500 pounds. Thereafter only sufficient make-up gas to maintain the desired reaction pressure was supplied. At a space velocity of 100,000, and a cataylst temperature of 420° C., 2.9 liters of condensate was produced per hour per liter of catalyst, this condensate containing 60.5% methanol by volume. Analysis of the gases showed 11% carbon dioxide by volume, this condition remaining constant over twelve hours of operation. It is observed that the practice of our invention which made possible the employment of an excess of hydrogen in the circulating system produced a much improved result over Example I in which a theoretical gas mixture was employed.

Example III

Hydrogen gas was supplied to the process through the make up gas pipe A until the pressure had been built up to 1,800 pounds. A gas mixture containing theoretical proportions (33:66) of carbon monoxide and hydrogen was then passed into the apparatus until the pressure had reached 3,300 pounds. Thereafter only sufficient "make-up" gas to maintain the desired reaction pressure was supplied. At a space velocity of 50,000 and a catalyst temperature of 420° C., 1.2 liters of condensate per hour per liter of catalyst was produced, this condensate containing 93% methanol. The gas mixture passing through the circulating system showed 14% carbon monoxide, on analysis. This method of operation provides an improved result since when similar reaction conditions were employed and a gas mixture of theoretical proportions was passed over the catalyst a yield of only 0.7 liters of condensate per hour per liter of catalyst was obtained.

Now having described our invention, we claim the following as new and novel:

1. In a process for the production of methanol by the catalytic interaction at elevated pressure of carbon oxides with hydrogen, the steps which comprise first circulating substantially pure hydrogen over a catalyst for the reaction, adding to said circulating gas a mixture of hydrogen and carbon oxides in proportions required to produce methanol, and continuing to add said mixture of hydrogen and carbon oxides at a rate sufficient to maintain the pressure during the reaction.

2. In the process for the production of methanol by the catalytic interaction at elevated pressure of carbon dioxide with hydrogen, the steps which comprise first circulating substantially pure hydrogen over a catalyst for the reaction, adding to said circulating gas a mixture of hydrogen and carbon dioxide in the proportions required for the production of methanol and continuing to add said mixture of hydrogen and carbon dioxide at a rate sufficient to maintain the pressure during the reaction.

3. In a process for the production of methanol by the catalytic interaction at elevated pressure of carbon oxides with hydrogen, the steps which comprise first circulating substantially pure hydrogen over a catalyst for the reaction at an elevated pressure, then increasing said pressure by adding a mixture of hydrogen and carbon oxides in the proportions required to produce methanol, said addition being continued at a rate sufficient to maintain the pressure of reaction.

4. In a process for the production of methanol by the catalytic interaction at elevated pressure of carbon dioxide with hydrogen, the steps which comprise first circulating substantially pure hydrogen over a catalyst for the reaction at an elevated pressure, then increasing said pressure by adding a mixture of hydrogen and carbon dioxide in the proportions required to produce methanol, said addition being continued at a rate sufficient to maintain the pressure of reaction.

5. In a process for the production of methanol by the catalytic interaction at an elevated pressure of carbon dioxide with hydrogen the steps which comprise circulating substantially pure hydrogen over a catalyst for the reaction at a pressure of about 1,800 pounds, then increasing said pressure to about 3,500 pounds by adding a mixture of hydrogen and carbon dioxide in the proportions required for the production of methanol, said addition being continued at a rate sufficient to maintain the pressure of reaction.

In testimony whereof we affix our signatures.

WILLIAM J. EDMONDS.
LEONARD A. STENGEL.